(12) United States Patent
Van Alphen

(10) Patent No.: US 12,285,006 B2
(45) Date of Patent: Apr. 29, 2025

(54) AGRICULTURE DEVICE FOR DISPENSING A LIQUID

(71) Applicant: EXEL INDUSTRIES, Paris (FR)

(72) Inventor: Martinus Henricus Van Alphen, Tilburg (NL)

(73) Assignee: EXEL INDUSTRIES, Paris (FR)

( * ) Notice: Subject to any disclaimer, the term of this patent is extended or adjusted under 35 U.S.C. 154(b) by 794 days.

(21) Appl. No.: 17/432,535

(22) PCT Filed: Feb. 21, 2020

(86) PCT No.: PCT/EP2020/054651
§ 371 (c)(1),
(2) Date: Aug. 20, 2021

(87) PCT Pub. No.: WO2020/169818
PCT Pub. Date: Aug. 27, 2020

(65) Prior Publication Data
US 2022/0132830 A1 May 5, 2022

(30) Foreign Application Priority Data
Feb. 21, 2019 (NL) .................................... 2022619

(51) Int. Cl.
*A01M 7/00* (2006.01)
*A01C 23/00* (2006.01)
(Continued)

(52) U.S. Cl.
CPC ......... *A01M 7/0089* (2013.01); *A01C 23/007* (2013.01); *A01C 23/047* (2013.01);
(Continued)

(58) Field of Classification Search
CPC .............. A01M 7/0089; A01M 7/0042; A01M 7/0075; A01C 23/007; A01C 23/047
See application file for complete search history.

(56) References Cited

U.S. PATENT DOCUMENTS 5,134,961 A * 8/1992 Giles .................... G05D 7/0688
239/71
2013/0105591 A1* 5/2013 Peterson .............. A01B 79/005
239/71

(Continued)

FOREIGN PATENT DOCUMENTS

BE 833401 A 12/1975
CN 1070080 C 3/1993
(Continued)

OTHER PUBLICATIONS

The First Search Report dated Sep. 7, 2022, for Chinese Patent Application No. 202080029867.3 (two (2) pages).
(Continued)

*Primary Examiner* — Tuongminh N Pham
(74) *Attorney, Agent, or Firm* — KDW Firm PLLC

(57) ABSTRACT

An agricultural device and a method for dispensing a liquid product over a surface. The device includes at least one boom and a plurality of nozzles positioned along the boom, a pressure regulation unit including a nozzle controller configured for controlling the opening and closing of one or more associated nozzles, and an inclination detection means for determining an inclination of the longitudinal supply line with respect to a horizontal. The pressure regulation unit and/or the at least one nozzle controller is configured to calculate nozzle operation data for each associated nozzle involving inclination data transmitted by the inclination detection means and the position of the nozzle on the longitudinal supply line, and the nozzle controller is configured to operate the nozzles based on the calculated nozzle operation data to obtain a homogeneous spraying of the liquid product over a surface of a field to be sprayed.

18 Claims, 5 Drawing Sheets

(51) Int. Cl.
 *A01C 23/04* (2006.01)
 *B05B 1/20* (2006.01)
 *B05B 12/02* (2006.01)
 *B05B 12/12* (2006.01)

(52) U.S. Cl.
 CPC ........ *A01M 7/0042* (2013.01); *A01M 7/0075* (2013.01); *B05B 1/20* (2013.01); *B05B 12/02* (2013.01); *B05B 12/12* (2013.01)

(56) References Cited

U.S. PATENT DOCUMENTS

| | | | |
|---|---|---|---|
| 2013/0153676 A1 | 6/2013 | Ballu | |
| 2013/0292487 A1 | 11/2013 | Ballu | |
| 2016/0044862 A1 | 2/2016 | Kocer | |
| 2016/0175869 A1* | 6/2016 | Sullivan | B05B 12/008 239/11 |
| 2017/0027103 A1* | 2/2017 | Grotelueschen | A01M 7/0057 |
| 2021/0307231 A1* | 10/2021 | Kurogi | A01B 69/006 |

FOREIGN PATENT DOCUMENTS

| | | |
|---|---|---|
| CN | 1461540 A | 12/2003 |
| CN | 102428904 A | 5/2012 |
| CN | 102507506 A | 6/2012 |
| CN | 102696032 A | 9/2012 |
| CN | 103096714 A | 5/2013 |
| CN | 103366015 A | 10/2013 |
| CN | 105217038 A | 1/2016 |
| CN | 105557666 A | 5/2016 |
| CN | 106202212 A | 12/2016 |
| CN | 106882380 A | 6/2017 |
| CN | 108605923 A | 10/2018 |
| CN | 108777938 A | 11/2018 |
| CN | 108873888 A | 11/2018 |
| EP | 1167095 A1 | 1/2002 |
| GE | P20084536 B | 11/2008 |
| RU | 77585 U1 | 10/2008 |
| SU | 1173964 A1 | 8/1985 |
| WO | 9001265 A1 | 2/1990 |
| WO | 2012022903 A1 | 2/2012 |
| WO | 2012032245 A1 | 3/2012 |
| WO | 2018154490 A1 | 8/2018 |

OTHER PUBLICATIONS

The First Search Report dated Sep. 22, 2022, for Chinese Patent Application No. 202080029814.1 (two (2) pages).
International Search Report and Written Opinion for the International Patent Application No. PCT/EP2020/054651, mailed Mar. 23, 2020, 14 pages.

* cited by examiner

AGRICULTURE DEVICE FOR DISPENSING A LIQUID

This is a national stage application filed under 35 U.S.C. § 371 of pending international application PCT/EP2020/054651, filed Feb. 21, 2020, which claims priority to Netherlands Patent Application No. NL 2022619, filed Feb. 21, 2019, the entirety of which applications are hereby incorporated by reference herein.

The present invention relates to a device and a method for dispensing a liquid product over a surface to be sprayed, such as an agricultural field. The present invention is applicable in the agricultural field in order to spray a field with a liquid phytosanitary product, such as a fertilizer or a pesticide, or other type.

Agriculture devices for dispensing a liquid over a surface of a field, such as an agricultural field, are known from practice. Such devices comprise a spray boom or, in short, a boom comprising a number of consecutive pipes or ducts for transporting the liquid to be sprayed. The consecutive pipes together are connected to a (longitudinal) section of the boom. A supply line is connected to the boom and extends from a liquid product supply along the longitudinal length of the boom. The supply line is connected via junctions with sub-supply line that extend from the boom to the pipe sections and to spray nozzles that are positioned thereon. The nozzles are adapted to spray the liquid product on a target, which is generally the ground or plants on an agricultural field. Often, the distance between the nozzles and the targeted object is approximately 25, 37.5, or 50 cm to obtain a good result.

During operation, liquid product is extracted from a product supply, such as a container, and subsequently pumped via the longitudinal supply lines formed by the pipes to the spray nozzles, or nozzles.

Generally, the pump is coupled to a bypass valve so as to bring the liquid product upstream of the supply conduits to a pressure proportional to the square of the speed of travel of the boom on the agricultural field, which ensures a constant overall flow rate of sprayed liquid product per treated surface unit. Often, such bypass valves are positioned in or on the pipe sections that form the supply line. A conventional boom may be up to 36 m long, or even 55 m. On a flat agricultural field, the boom is also horizontal and all of the nozzles are situated at the same height relative to the ground.

Since many agricultural fields have a non-planar topography, having raised areas, such as a slopes and/or a banking and/or a peak/valley configuration, the height and/or angle of the boom with respect to the ground or plants to be sprayed needs to be adjusted in order to maintain the desired distance between the nozzles and the ground or plants to be sprayed. Therefore, a known devices generally include means for adjusting the height of the pipes to the topology of the agricultural field, such that their outlets and associated nozzles are situated at different heights from one another. The adjustment of the boom height and inclination with respect to the ground surface results in pressure differences that depend on the height of the column of liquid separating them and the density of the liquid. As the flow rate of the nozzle is proportional to the square root of the pressure, the flow rate of liquid product differs on each nozzle, such that the liquid product is not uniformly sprayed on each surface unit. For example, in the case of a conventional rectilinear boom 36 m long moving over an 11% banking to spray a liquid fertilizaer with a density of 1.32 at an average boom pressure of 1.5 bar, the nozzle situated at the lower end of the boom withdraws 18% more liquid fertilizer than the nozzle situated at the upper end of the boom since the height difference of 3.9 m causes a difference between hydrostatic pressures at those nozzles, which are respectively 1.76 bar and 1.24 bar. Such a flow rate difference causes a major irregularity (18% in this example) in the treatment of the agricultural field between two consecutive shared passages, and therefore growth differences between plants that are less than 1 m adjacent.

Furthermore, certain standards require a maximum gap of 10% between the volumes of liquid product that are sprayed onto surface units during a same spraying operation. Farmers often require that that gap be limited to only 5%.

FR2963873 discloses a device for dispensing a liquid product over a surface. The device comprises a longitudinal bar to which a number of consecutive pipes are connected, each of which is provided with a pressure regulator. The pressure of the liquid product inside the longitudinal supply line and the consecutive pipes is measured, compared to each other and, when pressure differences between the pipes are present due to for example having an inclination of the boom, compensation the pressure difference to equalize the pressure between the various pipes. This solution enables the nozzles to spray about the same flow rate.

A disadvantage of this solution is however that additional mechanical components in the form of consecutive pipes, valves and regulators are required, which lead to increased weight of the device. The increased weight in turn results in increased manufacturing costs, increased operation costs and an increase in resources required for the manufacturing process. As such, all known devices have the disadvantage that additional components or additions are required to regulate the pressure in the supply line and/or the longitudinal supply line, leading to a costly and heavy construction.

The present invention aims to obviate or at least significantly reduce the aforementioned problems by providing a simpler and more accurate device and method for dispensing a liquid product.

To that end, the invention provides an agricultural device for dispensing a liquid product over a surface to be sprayed, such as an agricultural field comprising:
  at least one boom comprising a longitudinal supply line for transporting the liquid product and a plurality of nozzles that are positioned along the boom, wherein each nozzle is operatively connected to the longitudinal supply line;
  a liquid product supply that is connected to the longitudinal supply line for supplying to the longitudinal supply line the liquid product to be sprayed;
  a pressure regulation unit including at least one nozzle controller that is configured for controlling the opening and closing of one or more associated nozzles;
  an inclination detection means for determining an inclination of the longitudinal supply line with respect to a horizontal;
  wherein the pressure regulation unit and/or the at least one nozzle controller is configured to calculate nozzle operation data for each associated nozzle, the nozzle operation data at least containing a closing time, an opening time and a maximum closing time, wherein the nozzle operation data is calculated based on a calculation input at least including inclination data transmitted by the inclination detection means and the position of the nozzle on the longitudinal supply line, and wherein the nozzle controller is further configured to operate each of the one or more associated nozzles based on the calculated nozzle operation data to obtain a homogeneous spraying of the liquid product over a surface of a field to be sprayed.

It is noted that in the agricultural device according to the invention, the closing time and the opening time largely determine the amount of liquid that is sprayed at a certain position. This essentially means that the closing/opening time, also referred to in the application as open/close time or close/open time, is used to obtain the homogeneous spraying of the liquid product.

An advantage of the agricultural device according to the invention is that, due to the fact that the outflow of the nozzles is regulated by operating the open/close time of the nozzles, the use of additional mechanical structures is obviated and an agricultural device having a lower weight is obtained. The lower weight of the agricultural device in turn results in less soil compaction, better weight distribution, and lower fuel consumption.

It is noted that this weight reduction is achieved at several points compared to the existing devices. First of all, the use of pipe sections on which the nozzles are positioned are completely obviated in the device according to the invention. This means that, due to the fact that the nozzles are (directly) coupled to the supply line on the longitudinal boom and not to separate pipe sections, a significant amount of weight is obviated. Secondly, the intermediate supply line sections between the longitudinal supply line on the boom and the pipe sections is obviated as well, leading to an even further weight reduction. Thirdly, the use of bypass valves to increase the pressure in each of the pipe sections is also obviated in the device according to the invention due to the fact that the amount of sprayed liquid is regulated using the open/close time of each of the nozzles. In other words, the pressure difference in the longitudinal supply line is compensated by means of the open/close time of each of the valves.

Another advantage of the agricultural device according to the invention is that, by using the existing components on the boom for regulating the outflow and obviating additional mechanical components, the wear of the agricultural device and consequently the maintenance costs for agricultural device are reduced.

Another advantage of the agricultural device according to the invention is that the nozzle operation data includes real-time inclination data for the field to be sprayed, which allows the agricultural device to be deployed on any given field without modification for a specific location or field.

In a preferred embodiment according to the invention, the agricultural device comprises two booms that extend outwardly from opposite sides of the agricultural device, wherein the booms extend outwardly substantially perpendicular to a central vehicle axis that extends from a rear end of the vehicle to a front end of the vehicle.

An advantage of providing two booms on opposite sides of the agricultural device is that the device is relatively stable and is capable of spraying liquid to be sprayed over a larger surface.

In an embodiment according to the invention, the at least one boom may comprise one or more joints configured to allow a part of the boom to be rotated with respect to an adjacent part of the at least one boom during spraying and may comprise rotation means positioned at or near each joint, wherein the rotation means are configured to rotate the adjacent parts with respect to each other over an angle of 0°-90°.

An advantage of providing the at least one boom with joints and associated rotation means is that independent rotatable boom sections are formed, which allow a more accurate positioning of the boom over the (inclined) surface of the field or plants to be sprayed. The independent sections, which are formed by providing the joints, can each be positioned at different angles of rotation with respect to each other, which allows each section to be positioned more accurately over the field to be sprayed. As a result, a more accurate height of the nozzles over the field is achieved compared to the known devices in which only the boom as a whole is rotatable with respect to a central part of the agricultural device.

This is especially advantageous for fields that have different angles of inclination of a relatively short distance, since the different sections can be positioned to closely follow the contour of the field to be sprayed.

In an embodiment according to the invention, the inclination detection means may be provided in, at or near the one or more joints.

An advantage of providing the inclination detection means near, at or (integrally provided) in the joints allows an accurate detection of the inclination of the field and/or the rotation angle of the sections adjacent the joints. Therewith, the inclination of both the boom (sections) and the field can be measured in a single measurement.

By providing such an arrangement, it even becomes possible to compare the inclination data of the field with the rotation angle of the boom parts with each other, and, if required, detect a difference between the angle of a respective boom part and an inclination angle of the field to be sprayed. The comparison may subsequently be used in the calculation of the nozzle operation data.

In an embodiment according to the invention, the one or more of the rotation means may be formed as a telescopic arm or ram, wherein, in an unextended state of the telescopic arm, the associated boom parts are in line with each other, and wherein, in an extended state of the telescopic arm, the associated boom parts are positioned at angle with respect to each other.

An advantage of using a telescopic arm as rotation means is that such an arm provides an effective and strong rotation means that is capable of bearing the weight of the boom sections connected to it.

Another advantage of providing a telescopic arm as rotation means is that it provides a continuous range over which the connected boom sections are rotatable with respect to each other. It is preferred that the telescopic arm is connected to an upper side or a lower side of the boom sections, although it is also possible to mount the telescopic arm inside the boom sections.

In an embodiment according to the invention, the inclination detection means are configured to determine an extension length of the telescopic arm, and wherein the nozzle controller is configured to include the extension length of the telescopic arm in the calculation of the nozzle operation data.

The extension length of the telescopic arm is indicative for the rotation angle of the associated boom parts and, therewith, for the inclination of the boom with respect to the field to be sprayed. By including the extension length in the nozzle operation data, the inclination angle of the boom can be calculated in a relatively simple manner without necessarily having to provide additional sensors and/or measurement equipment on the boom.

Another advantage of measuring the extension length by the inclination means and including the extension length in the nozzle operation data is that an automatic compensation of the pressure difference due to the inclination is also taken into account when determining the open/close frequency of the nozzles. In other words, the open/close time and frequency of the nozzles includes all relevant data that is needed to achieve that the field is sprayed evenly.

In an embodiment according to the invention, the agricultural device may comprise a memory that is configured for storing and/or adjusting a contour map of the surface of the field to be sprayed, wherein the memory is operatively connected to the nozzle controller and the inclination detection means, and wherein the inclination detection means are additionally preferably configured for measuring and transmitting to the memory an inclination of the surface of the field with respect to a horizontal.

The agricultural device, by virtue of the inclination detection means, allows direct measurement of the inclination of the field to be sprayed. Additionally or alternatively, an indirect measurement may be provided to determine the inclination at and/or directly adjacent the position of the agricultural device. To that end, the agricultural device is provided with a memory in which a contour map of the field to be sprayed is stored, and which is useable to determine the position of the agricultural device with respect to the contour map.

An advantage of providing such an arrangement is that the position of the nozzles with respect to the inclination can be verified using different or additional sources. It is preferred that the position of the agricultural device on the field is determined using position devices, such as GPS, although other means of positioning, such as geofencing, relay poles and/or other options are also useable to this end.

In an embodiment according to the invention, the agricultural device additionally may comprise a speed detector that is configured to measure movement speed of the device, wherein the movement speed is provided to the nozzle controller to be included as calculation input for calculation of the nozzle operation data.

The movement speed of the agricultural device determines, amongst other factors, the quantity of liquid product that is provided to the surface of the field over a given period of time. It is therefore advantageous to include the movement speed in the calculation input for calculation of the nozzle operation data. The movement speed is preferably directly linked to the maximum closing time of the nozzles to allow the quantity of liquid product dispensed to the surface of the field to be equal for any given movement speed of the agricultural device.

In an embodiment the maximum closing time depends on the movement speed of the device, wherein the maximum closing time decreases with an increasing movement speed of the device and vice versa.

The advantage of providing a inverse negative relationship between the movement speed of the device and the maximum closing time of the plurality of nozzles is that the quantity of liquid product that is dispensed to the field to be sprayed becomes independent of the movement speed and, thus, substantially constant for each given speed of the agricultural device. This is especially interesting in view of the fact that there is a trend to increase the average movement speed of agricultural devices in general. The link between movement speed and maximum closing time allows a higher end speed and simultaneously ascertains that the quantity of dispensed liquid product remains substantially constant, even during acceleration and deceleration of the agricultural device.

In an embodiment according to the invention, the agricultural device may be a self-propelled vehicle, wherein the device may comprise a number of wheels, at least one angle sensor that is operatively connected to a steerable wheel of the number of wheels, wherein the at least one angle sensor is configured to measure a wheel angle of the associated wheel with respect to a central axis that extends from a rear end to a front end of the vehicle substantially parallel to a moving direction, and wherein the angle data is transmitted to the nozzle controller to be included as calculation input for calculation of the nozzle operation data.

The agricultural device may be provided as a self-propelled vehicle that preferably is provided with a number of wheels of which some are steerable to change direction of movement of the device. However, during a change of direction of the device such as a turning movement, the distance that the booms on either side of the device, and especially the outer ends of those booms, need to cover, differs for the different sides of the device. In other words, the boom on the radially inner side of the turning circle needs to cover less distance than the boom that is present on the radially outer side of the device. As a result, the quantity of liquid product sprayed on the field surface on the outer side of the radius is significantly less than the quantity of liquid product sprayed on the field surface on the inner side of the radius.

In order to obviate this problem, at least one of the steerable wheels of the agricultural device according to this embodiment is provided with an angle sensor to detect changes in direction with respect to a central axis of the agricultural device that extends from a rear end of the device to a front end of the device. It is noted that the term 'device', 'agricultural device' and 'vehicle' are used interchangeably in this respect.

The advantage of detecting the steering angle and subsequently using the information for calculating the nozzle operation data, the open/close time of the nozzles on the booms is adapted to correct for the difference in distance to be covered by the booms on different sides (i.e. outer radius and inner radius) of the agricultural device. As a result, the quantity of liquid product to be dispensed on the surface on either side is substantially equal.

In an embodiment according to the invention, the agricultural device may be a vehicle to be towed by another vehicle.

The agricultural device may also be provided as a vehicle to be towed and/or may be connected to a trailer for towing. For smaller applications and/or for exchangeable purposes, the agricultural device may be formed as a vehicle, such as a trailer, that is configured to be towed by another vehicle, such as a tractor. The agricultural device may also be integrated with or integral part of a trailer for the purpose of spraying liquid product to a field.

The advantage of providing the device as a separate, towable vehicle is that it is easier to lease, rent and/or co-use the vehicle by different parties, since it only requires the using party to provide a vehicle to tow the agricultural device.

In an embodiment according to the invention, the nozzle controller may comprise a number of electro-valves, wherein each electro-valve is associated with one or a number of nozzles, where each electro-valve is configured for receiving the nozzle operation data for setting the opening and the closing of the associated nozzles.

The use of electro-valves in the nozzle controller provides several advantages over traditional valves. An advantage of electro-valves is that they are low-maintenance and have a high reliability. Another advantage of electro-valves is that have a low power use and have a continuous control range, rather than only an on/off regulation.

In an embodiment according to the invention, the electro-valves may be connected to each other via a communication system or bus.

In a preferred embodiment the bus comprises a CAN bus.

For the purpose of the invention, it is noted that a CAN-bus is a Controller Area Network-bus, which is used to provide a reliable device to allow and control communication, i.e. signals, between the different electro-valves.

By providing a CAN-bus connection between the electro-valves, a robust, reliable and relatively low cost connection is established. In addition, the use of a CAN-bus connection reduces the need for (copper) wiring, which reduces weight of the agricultural device.

In an embodiment according to the invention, the electro-valves may be controlled with a PWM signal according to a Duty Cycle (DC) formula, wherein the Duty Cycle formula is defined as $DC=T2/(T1+T2)$.

For the purpose of the invention, it is noted that PWM is Pulse-Width Modulation. PWM provides the advantage that it modulates the signal to the valves in a cost-effective manner.

The invention also relates to a method for dispensing a liquid product over a surface of a field, such as an agricultural field, the method comprising the steps of:
   providing a device according to any one of the preceding embodiments;
   determining the inclination of the longitudinal supply line and/or the boom with respect to a horizontal using the inclination detection means;
   transmitting inclination data from the inclination detection means to the pressure regulation unit and/or nozzle controller;
   calculating by the pressure regulation unit and/or nozzle controller and based on the inclination data and a position of the nozzle, nozzle operation data at least containing a closing time T1, an opening time T2 and a maximum closing time of each nozzle to achieve a homogeneous dispensing of the liquid product over the surface of the field.

The method according to the invention has similar effects and advantages as the abovementioned agricultural device.

Another advantage of the method according to the invention is that the calculation of the nozzle operation data can be adapted to specific circumstances by including and/or excluding parameters that are relevant for a specific field to be sprayed. This may for example include the adaptation of the calculation to selectively include data on inclination of the field, type of crop to be sprayed and the specific geometry of the field, such as the amount of curves.

In an embodiment of the method according to the invention, the step of determining the inclination of the longitudinal supply line and/or the boom with respect to the horizontal additionally may comprise mapping the surface of the field based on the measured inclination data to obtain and/or adjust a contour map of the surface of the field, and storing the contour map in the memory of the device, wherein the memory preferably is positioned in the nozzle controller.

The inclination of the longitudinal supply line and/or the boom can alternatively or additionally be performed by mapping and storing the geographical and contour information of the field to be sprayed and subsequently using the stored information to determine the position and therewith the required inclination of the boom and/or the longitudinal supply line. Preferably, the memory is stored in the nozzle controller, since the nozzle controller is also configured to calculate the nozzle operation data which in this embodiment of the method includes the mapped inclination data and the current position of the agricultural device according to the invention.

In an embodiment of the method according to the invention, the method may comprise the steps of measuring the movement speed of the device and/or measuring an angle of one or more steerable wheels of the device when mounted on a self-propelled vehicle, and calculating the nozzle operation data, wherein the calculation is additionally based on the movement speed of the device and/or the angle of the steerable wheels.

An advantage of measuring the movement speed and/or an angle of a curve that is made by the device allows for a more even spraying over the field during movement including for turns and or acceleration/deceleration of the device over the field.

In an embodiment of the method according to the invention, wherein the nozzle controller may comprise electro-valves, and wherein the method additionally may comprise receiving by the electro-valves the nozzle operation data for associated nozzles, and controlling the electro-valves using a PWM signal according to a Duty Cycle formula $DC=T2/(T1+T2)$.

The invention is described in the foregoing as example. It is understood that those skilled in the art are capable of realizing different variants of the invention without actually departing from the scope of the invention. Further advantages, features and details of the invention are elucidated on the basis of preferred embodiments thereof, wherein reference is made to the accompanying drawings, in which.

Figure 1A:
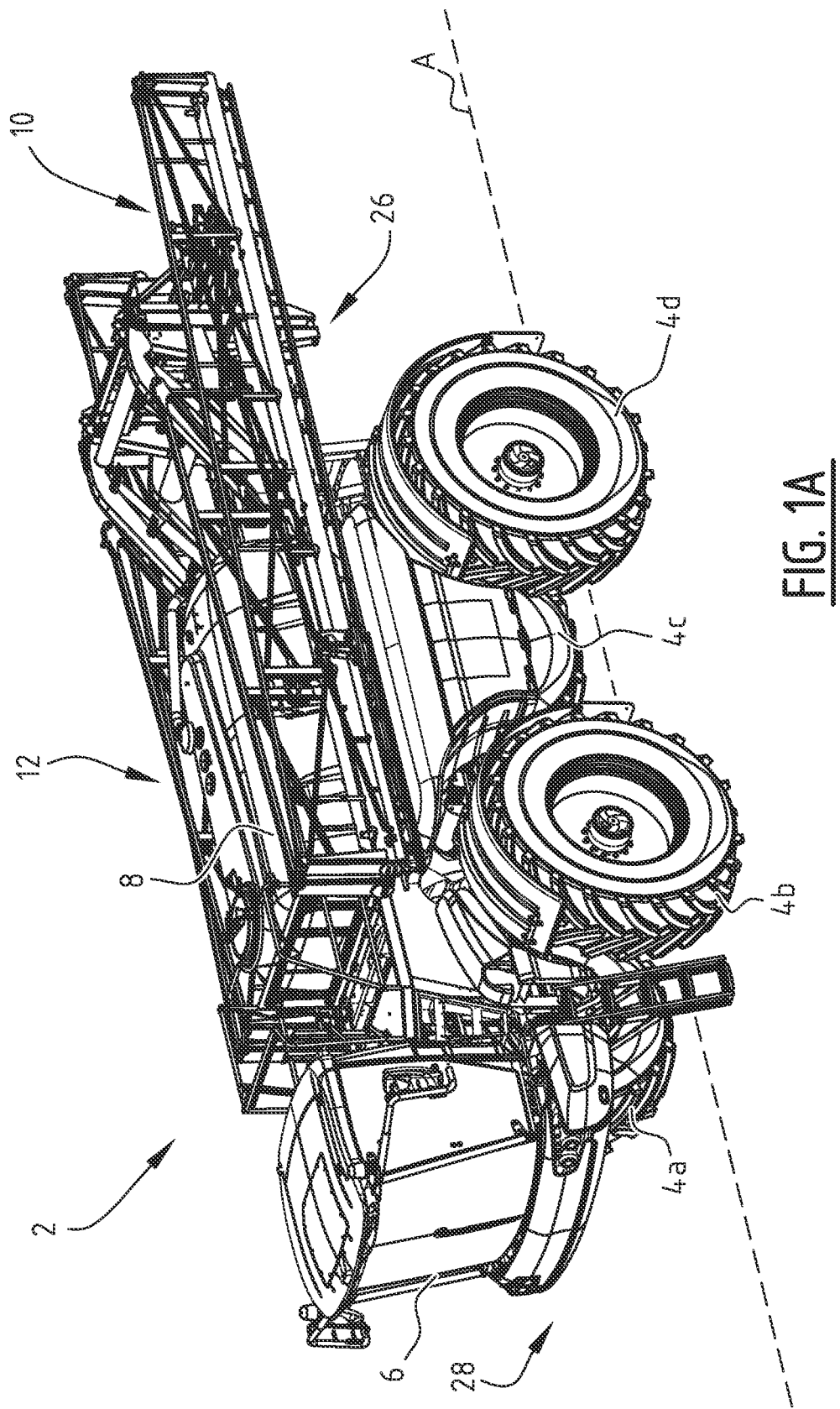
FIG. 1a shows a perspective view of an example of an agricultural device according to the invention.

Agricultural device 2 according to an example of the invention (see FIGS. 1a, 1b) shows self-propelled device 2 that is provided with wheels 4a, 4b, 4c. 4d that are connected to a drive assembly (not shown) and with driver cabin 6 from which an operator can control agricultural device 2. Agricultural device 2 further comprises liquid product supply 8 in the form of storage tank 8 in which liquid product that is to be dispensed over a surface S is provided. In this example, agricultural device 2 comprises two booms 10, 12. Boom 10 is provided with longitudinal supply line 14 and a plurality of nozzles 18a-18x which are distributed along boom 10. Each of the nozzles 18a-18x is fluidly connected with longitudinal supply line 14 of boom 10, which longitudinal supply line 14 has end portion 22 that is fluidly connected with liquid product supply 8.

Boom 12 is provided with longitudinal supply line 16 and a plurality of nozzles 20a-20x which are distributed along boom 12. Each of the nozzles 20a-20x is fluidly connected with longitudinal supply line 16 of boom 12, which longitudinal supply line 16 has end portion 24 that is fluidly connected with liquid product supply 8.

Figure 2:
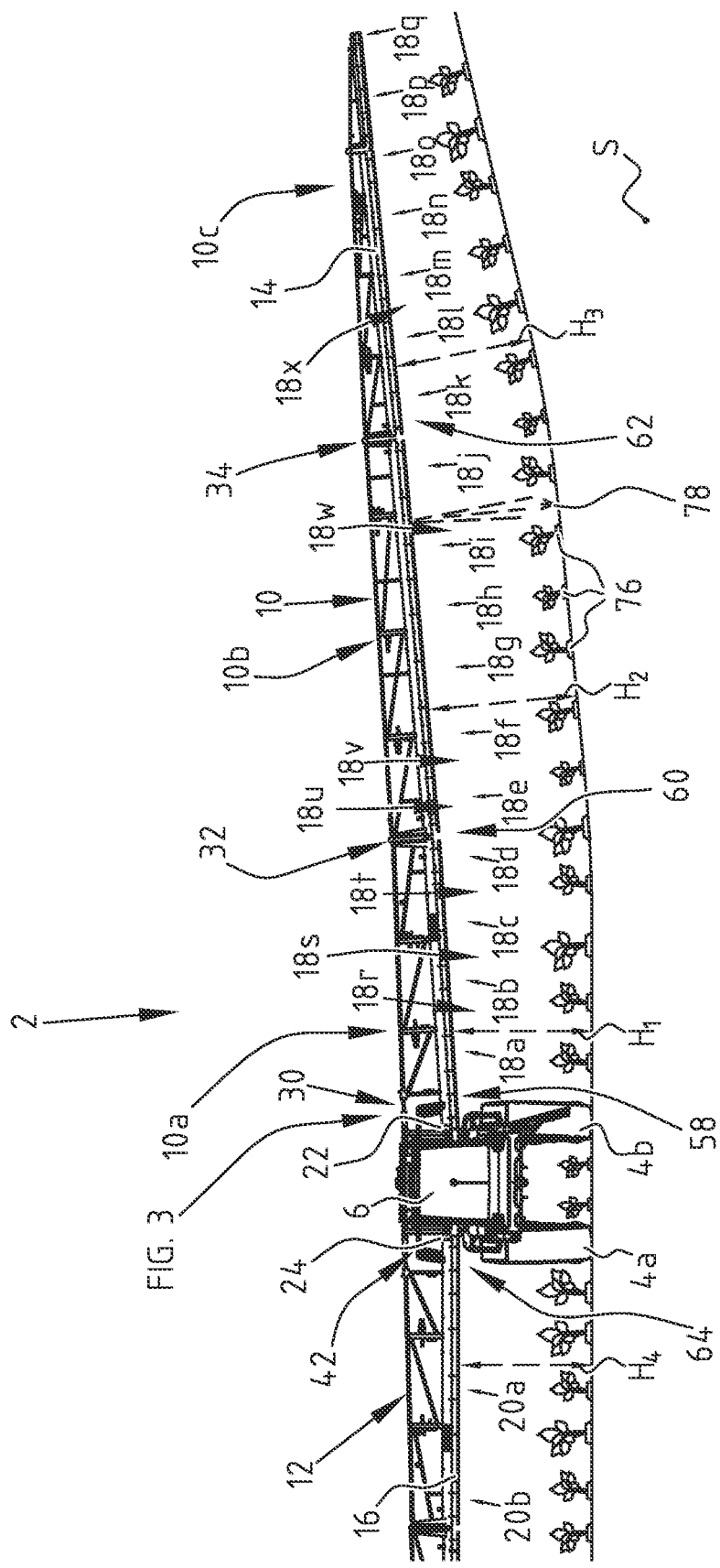
FIG. 2 shows the agricultural device of FIG. 1b, in which one of the booms is rotated with respect to the agricultural device.
Figure 3:
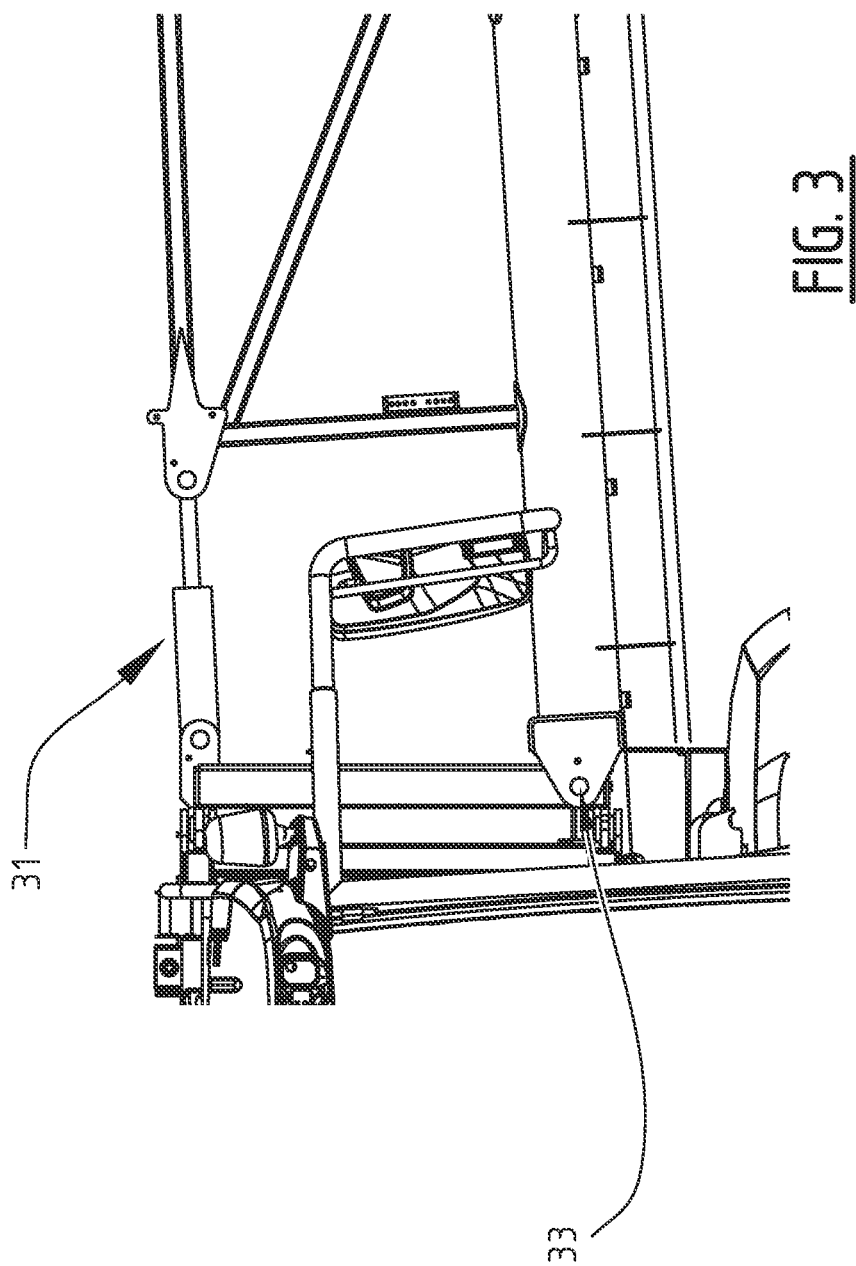
FIG. 3 shows a detailed view of a part of the rotated boom of the device of FIG. 1b; and, FIG. 4 shows an example of the connections between various regulation components of an example of the device according to the invention.

In an example shown in FIG. 2, boom 10 is rotated over an angle of about 20°, which allows boom 10 to extend parallel to an inclined surface. In FIG. 3 is shown that the rotation of boom 10 is provided around joint 33 by retracting telescopic arm 31 over a predefined length to establish the desired rotation angle to allow boom 10 to extend parallel to an inclined surface as presented in FIG. 2.

Figure 1B:
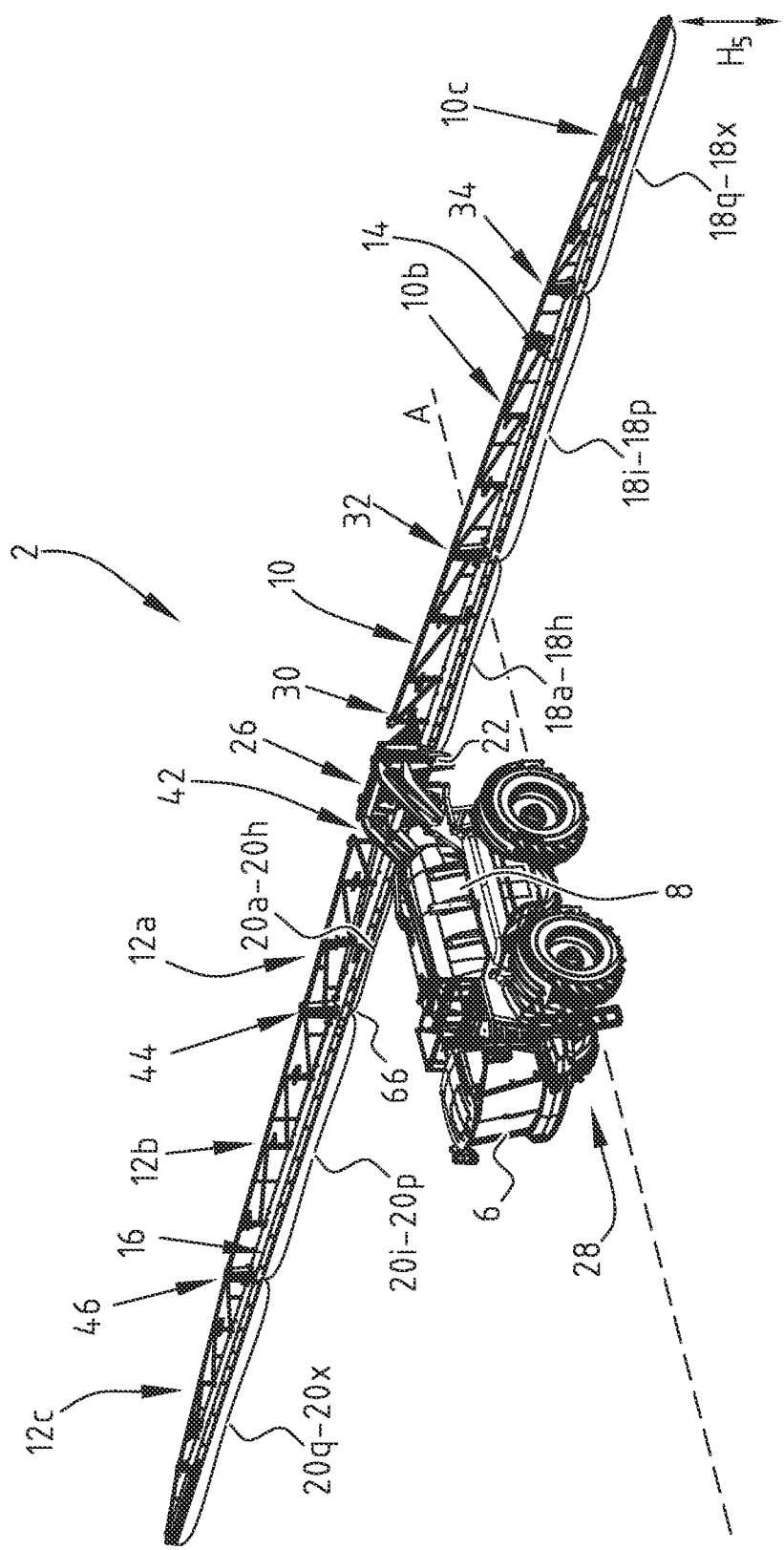
FIG. 1b shows the device of FIG. 1 in which the booms are extended.

In this example, booms 10, 12 each are foldable between a storage position (see FIG. 1a) and a spray position (see FIG. 1b). In the active position, booms 10, 12 extend outwardly on opposite sides from the agricultural device 2 (see FIG. 1b). In this position, booms 10, 12 extend substantially perpendicular to a central axis A, which central axis A extends substantially parallel to moving direction D from rear end 26 to front end 28 of device 2. In the storage position, each of booms 10, 12 is rotated inwardly over an angle of about 90° and folded, such that each of booms 10, 12 extends at least partially parallel to central axis A of agricultural device 2 (see FIG. 1a).

In another example of the present invention boom 10 and 12 respectively comprises sub-booms 10a, 10b, and 10c and sub-booms 12a, 12b, and 12c that can have independent inclination angles. In this example, boom 10 comprises three joints 30, 32, 34 and associated rotation means 36, 38, 40 which in this example are formed by telescopic arms 36, 38, 40. Joints 30, 32, 34 effectively divide boom 10 in three sub-booms 10a, 10b, 10c, which are rotatable over an angle with respect to each other.

Similarly, boom 12 comprises three joints 42, 44, 46 and associated rotation means 48, 50, 52 which in this example are formed by rams or telescopic arms 48, 50, 52. Joints 42, 44, 46 effectively divide boom 12 in three sub-booms 12a, 12b, 12c, which are rotatable over an angle with respect to each other to provide an at least partially inclined boom 12.

Agricultural device 2 further comprises pressure regulation means 54, which include at least one nozzle controller 56 to control the opening and closing of one or more of associated nozzles 18a-18x, 20a-20x on respective booms 10, 12. In this example, boom 10 comprises three inclination detection sensors 58, 60, 62, each of which positioned is near an associated joint 30, 32, 34 to measure a distance H1, H2, H3 between a part of the respective longitudinal supply line 14 that is positioned on each of sub-booms 10a, 10b, 10c and a surface S located beneath said sub-boom 10a, 10b, 10c. In addition, boom 12 also comprises three inclination detection sensors 64, 66, 68, each of which positioned is near an associated joint 42, 44, 46 to measure a distance H4, H5, H6 between a part of the respective longitudinal supply line 16 that is positioned on each of sub-booms 12a, 12b, 12c and a surface S located beneath said sub-boom 12a, 12b, 12c.

Pressure regulation unit 54 and/or nozzle controller 56 is configured to calculate nozzle operation data for each associated nozzle 18a-18x, 20a-20x. The nozzle operation data at least contains a closing time (T1), an opening time (T2) and an opening/closing frequency (F) for each of the associated nozzles 18a-18x, 20a-20x and is calculated based on a calculation input. The calculation input at least includes inclination data transmitted by inclination detection means 58, 60, 62, 64, 66, 68 and the position of associated nozzles 18a-18x, 20a-20x on associated longitudinal supply lines 14, 16. Nozzle controller 56 is further configured to operate each of associated nozzles 18a-18x, 20a-20x based on the calculated nozzle operation data to obtain a homogeneous spraying of the liquid product over a surface of a field to be sprayed, and in particular on plants 76 and/or weed 78.

Agricultural device 2 in this example additionally includes a speed detector 70 and an angle sensor 72, which are operatively connected to pressure regulation unit 54 and nozzle controller 56. Speed detector 70 is configured to measure the movement speed of device 2 and relate the speed information to pressure regulation unit 54 and/or nozzle controller 56 in order to be included as calculation input for calculating the nozzle operation data. Angle sensor 72 is operatively connected to one of steerable wheels 4a, 4b and is configured to measure a wheel angle of the associated wheel 4a, 4b with respect to central axis A. The angle data is transmitted to pressure regulation unit 54 and/or nozzle controller 56 to be included as calculation input for calculation of the nozzle operation data. It is noted that these additional components may also be omitted from agricultural device 2 as shown in this example.

Additionally, agricultural device 2 may also include memory 74 that is operatively connected to pressure regulation unit 54 and/or nozzle controller 56 and additionally to one or more of speed detector 70, angle sensor 72 and inclination detection means 58, 60, 62, 64, 66, 68 for storing collected measurement data. Additionally, memory 74 in this example is also used for storing and adjusting a contour map of the surface of the field to be sprayed. This requires that memory 74 is operatively connected to inclination detection means 58, 60, 62, 64, 66, 68 and at least pressure regulation unit 54 or nozzle controller 56. It is preferred that inclination detection means 58, 60, 62, 64, 66, 68 are also configured for measuring and transmitting to memory 74 an inclination of surface S of the field with respect to a horizontal.

Figure 4:
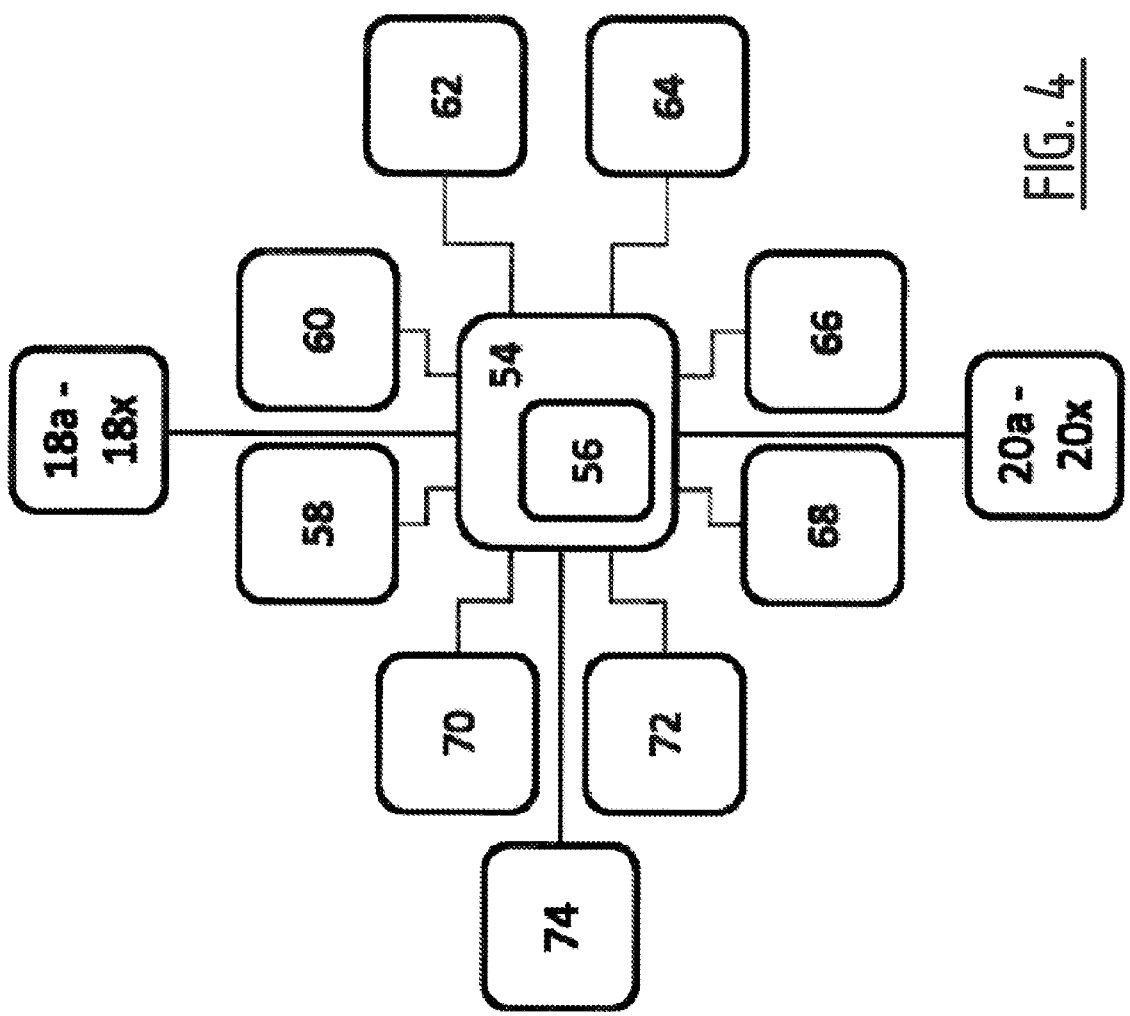

An example of possible connections between the different components, including optional components, of agricultural device 2 is provided in FIG. 4. This example shows pressure regulation unit 54 and nozzle controller 56, as being part of pressure regulation unit 54, as well as inclination detection means 58, 60, 62, 64, 66, 68 each being connected to memory 74. The optional components in this example are angle sensor 72 and speed detector 70, which are also connected to memory 74 and to pressure regulation unit 54.

The present invention is by no means limited to the above described preferred embodiments thereof. The rights sought are defined by the following claims within the scope of which many modifications can be envisaged.

The invention claimed is:

1. An agricultural device for dispensing a liquid product over a surface to be sprayed, such as an agricultural field, the device comprising:

at least one boom comprising a longitudinal supply line for transporting the liquid product and a plurality of nozzles that are positioned along the boom, wherein each nozzle is operatively connected to the longitudinal supply line;

a liquid product supply that is connected to the longitudinal supply line for supplying to the longitudinal supply line the liquid product to be sprayed;

a speed detector configured to measure movement speed of the device;

a pressure regulation unit including at least one nozzle controller that is configured for controlling the opening and closing of one or more associated nozzles; and an inclination detection means for determining an inclination of the longitudinal supply line with respect to a horizontal;

wherein the pressure regulation unit is configured to calculate nozzle operation data for each associated nozzle, the nozzle operation data at least containing a closing time (T1) and an opening time (T2), wherein the nozzle operation data is calculated based on a calculation input at least including inclination data transmitted by the inclination detection means and the position of the nozzle on the longitudinal supply line, and wherein the nozzle controller is further configured to operate each of the one or more associated nozzles based on the calculated nozzle operation data to obtain a homogeneous spraying of the liquid product over a surface of a field to be sprayed; and wherein the movement speed is provided to the nozzle controller to be included as calculation input for calculation of the nozzle operation data, wherein the maximum closing time depends on the movement speed of the device, and wherein the maximum closing time decreases with an increasing movement speed of the device and vice versa; and wherein the nozzle controller comprises a plurality of electro-valves, wherein each electro-valve is associated with one or a number of nozzles, where each electro-valve is configured for receiving the nozzle operation data for setting the opening and the closing of the associated nozzles, wherein the electro-valves are controlled with a PWM signal according to a Duty Cycle (DC) formula, wherein the Duty Cycle formula is defined as DC=T2/(T1+T2).

2. The agricultural device for dispensing a liquid product according to claim 1, wherein the at least one boom comprises:
one or more joints configured to allow a part of the boom to be rotated with respect an adjacent part of the at least one boom during spraying;
rotation means positioned at or near each joint, wherein the rotation means are configured to rotate the adjacent parts with respect to each other over an angle of 0°-90°.

3. The agricultural device for dispensing a liquid product according to claim 2, wherein the inclination detection means are provided in, at or near the one or more joints.

4. The agricultural device for dispensing a liquid product according to claim 2, wherein the rotation means are formed as a telescopic arm or ram, wherein, in an unextended state of the telescopic arm, the associated boom parts are in line with each other, and wherein, in an extended state of the telescopic arm, the associated boom parts are positioned at an angle with respect to each other.

5. The agricultural device according to claim 4, wherein the inclination detection means are configured to determine an extension length of the telescopic arm, and wherein the nozzle controller is configured to include the extension length of the telescopic arm in the calculation of the nozzle operation data.

6. The agricultural device for dispensing a liquid product according to claim 1, wherein the device comprises a memory configured for storing and/or adjusting a contour map of the surface of the field to be sprayed, wherein the memory is operatively connected to the nozzle controller and the inclination detection means, and wherein the inclination detection means are additionally configured for measuring and transmitting to the memory an inclination of the surface of the field with respect to a horizontal.

7. The agricultural device for dispensing a liquid product according to claim 1, wherein the device is a self-propelled vehicle, and wherein the device comprises:
a plurality of wheels; and
at least one angle sensor that is operatively connected to a steerable wheel of the number of wheels, wherein the at least one angle sensor is configured to measure a wheel angle of the associated wheel with respect to a central axis that extends from a rear end to a front end of the vehicle substantially parallel to a moving direction, and wherein the angle data is transmitted to the nozzle controller to be included as calculation input for calculation of the nozzle operation data.

8. The agricultural device for dispensing a liquid product according to claim 1, wherein the device is a vehicle to be towed by another vehicle.

9. The agricultural device for dispensing a liquid product according to claim 1, wherein the electro-valves are connected to each other via a CAN bus.

10. A method for dispensing a liquid product over a surface of a field, such as an agricultural field, the method comprising the steps of:
providing a device comprising at least one boom comprising a longitudinal supply line for transporting the liquid product and a plurality of nozzles that are positioned along the boom, wherein each nozzle is operatively connected to the longitudinal supply line; —a liquid product supply that is connected to the longitudinal supply line for supplying to the longitudinal supply line the liquid product to be sprayed; —a speed detector configured to measure movement speed of the device; —a pressure regulation unit including at least one nozzle controller that is configured for controlling the opening and closing of one or more associated nozzles; and—an inclination detection means for determining an inclination of the longitudinal supply line with respect to a horizontal;
wherein the pressure regulation unit is configured to calculate nozzle operation data for each associated nozzle, the nozzle operation data at least containing a closing time (T1) and an opening time (T2), wherein the nozzle operation data is calculated based on a calculation input at least including inclination data transmitted by the inclination detection means and the position of the nozzle on the longitudinal supply line, and wherein the nozzle controller is further configured to operate each of the one or more associated nozzles based on the calculated nozzle operation data to obtain a homogeneous spraying of the liquid product over a surface of a field to be sprayed; and
wherein the movement speed is provided to the nozzle controller to be included as calculation input for calculation of the nozzle operation data, wherein the maximum closing time depends on the movement speed of the device, and wherein the maximum closing time decreases with an increasing movement speed of the device and vice versa; and
wherein the nozzle controller comprises a plurality of electro-valves, wherein each electro-valve is associated with one or a number of nozzles, where each electro-valve is configured for receiving the nozzle operation data for setting the opening and the closing of the associated nozzles, wherein the electro-valves are controlled with a PWM signal according to a Duty Cycle (DC) formula, wherein the Duty Cycle formula is defined as DC=T2/(T1+T2);
determining the inclination of the longitudinal supply line and/or the boom with respect to a horizontal using the inclination detection means;
transmitting inclination data from the inclination detection means to the pressure regulation unit;
measuring the movement speed of the device; and
calculating by the pressure regulation unit and based on the inclination data and a position of the nozzle, nozzle operation data at least containing a closing time T1, an opening time T2 and a maximum closing time of each nozzle to achieve a homogeneous dispensing of the liquid product over the surface of the field; and calculating the nozzle operation data is additionally based on the movement speed of the device and wherein the maximum closing time decreases with an increasing movement speed of the device and vice versa.

11. The method according to claim 10, wherein the step of determining the inclination of the longitudinal supply line and/or the boom with respect to the horizontal additionally comprises:

mapping the surface of the field based on the measured inclination data to obtain and/or adjust a contour map of the surface of the field; and storing the contour map in a memory of the device.

12. The method according to claim 10, comprising the steps of:

measuring an angle of one or more steerable wheels of the device when mounted on a self-propelled vehicle; and calculating the nozzle operation data, wherein the calculation is additionally based on the angle of the steerable wheels.

13. The method according to claim 10, wherein the nozzle controller comprises electro-valves, and wherein the method additionally comprises:

receiving by the electro-valves the nozzle operation data for associated nozzles; and—controlling the electro-valves using a PWM signal according to the Duty Cycle formula DC=T2/(T1+T2).

14. An agricultural device for dispensing a liquid product over a surface to be sprayed, such as an agricultural field, the device comprising:

at least one boom comprising a longitudinal supply line for transporting the liquid product and a plurality of nozzles that are positioned along the boom, wherein each nozzle is operatively connected to the longitudinal supply line;

a liquid product supply that is connected to the longitudinal supply line for supplying to the longitudinal supply line the liquid product to be sprayed;

a pressure regulation unit including at least one nozzle controller that is configured for controlling the opening and closing of one or more associated nozzles; and an inclination detection means for determining an inclination of the longitudinal supply line with respect to a horizontal;

wherein the pressure regulation unit is configured to calculate nozzle operation data for each associated nozzle, the nozzle operation data at least containing a closing time (T1) and an opening time (T2), wherein the nozzle operation data is calculated based on a calculation input at least including inclination data transmitted by the inclination detection means and the position of the nozzle on the longitudinal supply line, and wherein the nozzle controller is further configured to operate each of the one or more associated nozzles based on the calculated nozzle operation data to obtain a homogeneous spraying of the liquid product over a surface of a field to be sprayed, wherein the at least one boom comprises:

one or more joints configured to allow a part of the boom to be rotated with respect an adjacent part of the at least one boom during spraying; and rotation means positioned at or near each joint, wherein the rotation means are configured to rotate the adjacent parts with respect to each other over an angle of 0°-90°, wherein the device comprises a memory that is configured for storing and/or adjusting a contour map of the surface of the field to be sprayed, wherein the memory is operatively connected to the nozzle controller and the inclination detection means; and wherein the nozzle controller comprises a plurality of electro-valves, wherein each electro-valve is associated with one or a number of nozzles, where each electro-valve is configured for receiving the nozzle operation data for setting the opening and the closing of the associated nozzles, wherein the electro-valves are controlled with a PWM signal according to a Duty Cycle (DC) formula, wherein the Duty Cycle formula is defined as DC=T2/(T1+T2).

15. The agricultural device according to claim 14, wherein one or more of the rotation means are formed as a telescopic arm or ram, wherein, in an unextended state of the telescopic arm, the associated boom parts are in line with each other, and wherein, in an extended state of the telescopic arm, the associated boom parts are positioned at angle with respect to each other.

16. The agricultural device according to claim 15, wherein the inclination detection means are configured to determine an extension length of the telescopic arm, and wherein the nozzle controller is configured to include the extension length of the telescopic arm in the calculation of the nozzle operation data.

17. The method according to claim 11, wherein the memory is positioned in the nozzle controller.

18. The agricultural device according to claim 14, wherein the inclination detection means are additionally configured for measuring and transmitting to the memory an inclination of the surface of the field with respect to a horizontal.

* * * * *